July 14, 1959 E. HENDERSON ET AL 2,894,448
COMBINATION SMOKE OVEN AND ALL PURPOSE COOKER
Filed Dec. 13, 1957 2 Sheets-Sheet 1

INVENTORS
Elmer Henderson
Annie Laurie Henderson
BY
ATTORNEY

July 14, 1959   E. HENDERSON ET AL   2,894,448
COMBINATION SMOKE OVEN AND ALL PURPOSE COOKER
Filed Dec. 13, 1957   2 Sheets-Sheet 2

INVENTORS
Elmer Henderson
Annie Laurie Henderson

BY
ATTORNEY

United States Patent Office 2,894,448
Patented July 14, 1959

2,894,448

COMBINATION SMOKE OVEN AND ALL PURPOSE COOKER

Elmer Henderson and Annie Laurie Henderson, Jackson, Miss.

Application December 13, 1957, Serial No. 702,663

4 Claims. (Cl. 99—444)

This invention relates to a cooking device, and it particularly relates to an outdoor type cooking device adaptable to various kinds of cooking procedures, though not so limited as it may be used indoors with a smoke and vapor removing hood as is used with a kitchen stove.

Heretofore, outdoor type cookers have been subject to various disadvantages generally. For one thing, the drippings from fat and juices from cooking meat, either dropping directly onto the coals or being heated too hot imparted a disagreeable burnt grease taste to the meat. For another thing the fire had to be constantly tended as there was always the danger of a flare up of fire, even in the ones with covers for as soon as the lid was raised or removed more oxygen got to the fire and it blazed up at this point if at no other time, which in any case will burn the meat and smoke the grease. Another disadvantage was the effect of not being able to maintain an event heat in all cooking parts of them, which deteriorated the quality of the product cooked, in that too high heat shrank and dried out the meat too much, and left parts of it burned, while other parts in the same cooker were not done. Yet another disadvantage was that the fire and meat were both adversely affected by elements of weather, a sudden rain, strong winds etc., either or all upset the cooking process, also fuel waste from the elements effect was tremendous. Another disadvantage was, that although cooking was attained it took too much charcoal for fueling, as in some cases the charcoal would cost as much as the meat cooked. Other disadvantages were they were too hard to fire, everything having to be dismantled before charcoal or wood blocks or chips could be added or other such inconveniences that the operator was exhausted by the time the food was done. In addition, it was usually necessary to clean out the ashes, before the device could be used, thereby making its use troublesome and difficult. One great disadvantage was that the types of cooking usually were very limited and if one wanted to do all types of outdoor cooking, he would have to own too many different devices, which everyone could not afford, or could not easily store.

It is the primary object of the present invention to overcome the above and other disadvantages of the prior art by providing a cooking device of the outdoor type which prevents the imparting of a burnt grease taste to the food being cooked, either by sudden blazing of the fire or overheated grease and drippings, but which imparts a sweet wood smoke taste.

Another object of the present invention is to provide a cooking device of the outdoor type which is adaptable to various cooking procedures such as "smoke oven," baking, broiling, frying, boiling or old time barbecuing directly over the hot coals as well, and to attain all of the above cooking processes in a simple and easy manner by rearranging the different parts used for each type of cooking, thereby eliminating the need to own more than one type of outdoor cooking device.

Another object of the present invention is to provide a cooking device of the outdoor type that is more economical to operate.

Another object of the present invention is to provide a cooking device of the outdoor type wherein the food as well as the fire are protected from the elements.

Another object of the present invention is to provide a cooking device of the outdoor type that is easy to fire, not only in the beginning of a cooking process, but all during any cooking process.

Another object of the present invention is to provide a cooking device of the outdoor type which completely does away with the worry of ashes, either during a cooking process or when one is ready to put fire in it in the beginning.

Another object of the present invention is to provide a cooking device of the outdoor type that one can fry and boil on in the outdoors without heat loss to wind and the elements.

Another object of the present invention is to provide a cooking device of the outdoor type which eliminates most of the danger encountered when frying or boiling on open fires: that of the hot water or fat being spilled on bystanders.

Another object of the present invention is to provide a device for the age old curing process of smoking, to be used in the curing of meat, fish and fowl, which is not actually a cooking process, but is a slow smoke process for curing and drying.

Other objects of the present invention are to provide an improved cooking device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 3 is a perspective view of the heat and grease deflector unit.

Fig. 4 is a top view taken on line 4—4 of Fig. 2.

Fig. 5 is a top view of the grate separating the fire box from the ash box.

Figure 1:
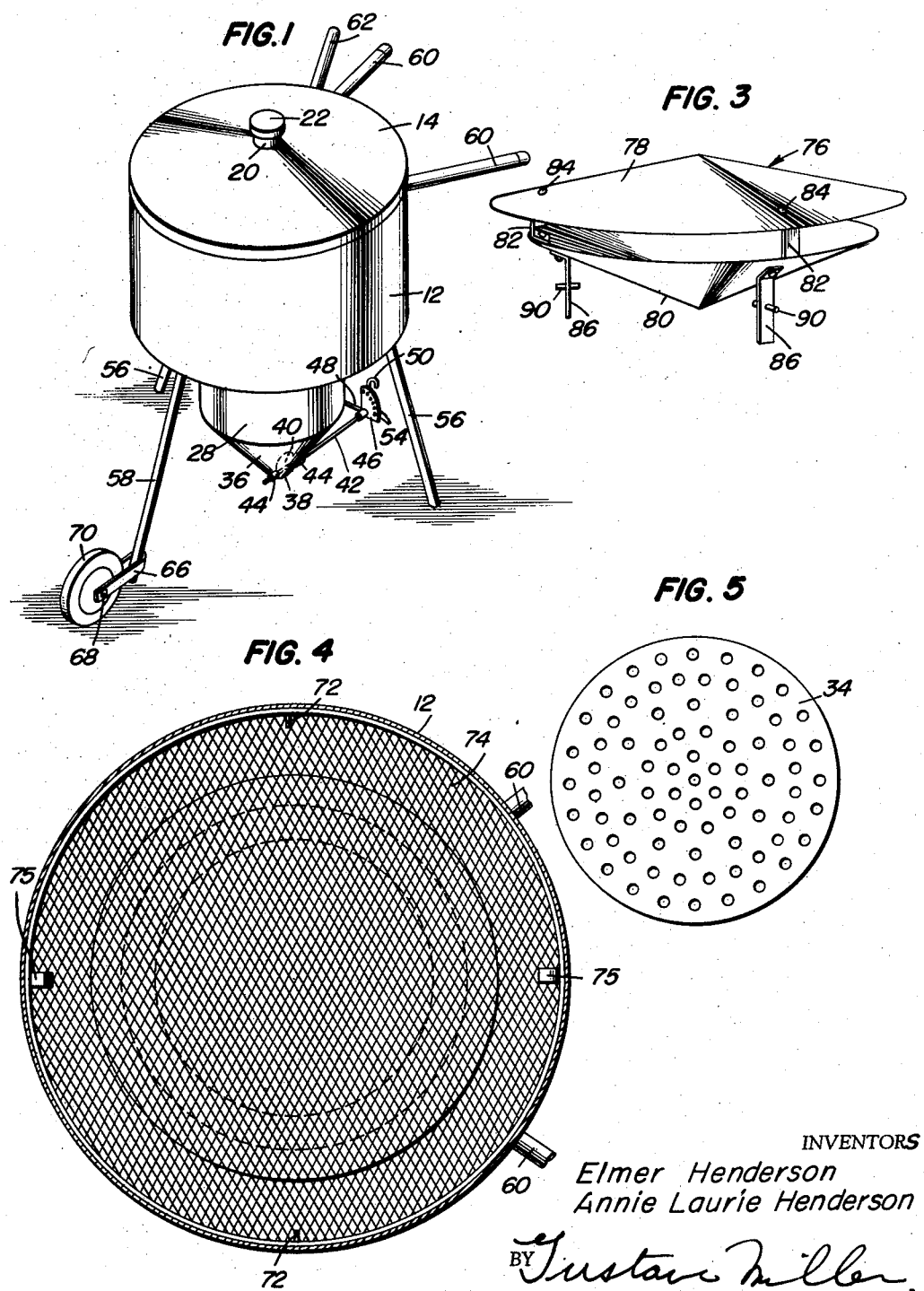
Fig. 1 is a top perspective view of a cooking device embodying the present invention.

Referring generally to the drawings, it may be seen that by inserting the heat and grease deflector unit 76 in place in top of fire box opening 28, the following primary cooking process of this invention is attained, and is named "smoke oven" cooking, as that is exactly what it is. A combination of baking and broiling with a certain amount of deflected direct heat is attained, which gives the best effect of both types of cooking, in one process, but which could not be attained with either alone. This low temperature cooking method imparts moist tender texture, very little shrinkage, no burned edges and uniformity in doneness. All this is done with no constant tending, as fire and heat are both fully controlled. Also the direct heat is deflected away from the top plate 78 by the bottom plate 80, which comprises unit 76, by the resulting air space between the two being at their greatest distance apart at what would be its hottest point over the center of the fire-box. Thus the grease and drippings that fall on top of unit 76 are carried downward to fall in the downdrain part of bottom 26 in a manner that the grease is never heated to the smoking point, which would cause the food to have a burnt grease taste, similar to that imparted by grease dropping directly onto hot coals. Since grease cannot drop onto the coals in this cooking process, both causes for burnt grease taste are eliminated. Actually the grease and drippings are separated and carried out of the cooker, away from heat or fire.

During the "smoke oven" cooking described above, the smoked flavor may be added by means of inserting a small wood block or chips of the desired wood into the fire-box door on top of the charcoal at intervals, to attain the amount of smoke flavor desired. This wood does not blaze, it just smoulders and smokes, unless more oxygen is let in, and if it did blaze while doors were open, it wouldn't hurt anything, as the fire could not get to the food, and the blaze goes out as soon as the door is closed again.

The same operation as above can be used for any slow temperature cooking without wood smoke, if it is not wanted on certain foods, and the same arrangement of parts are used for baking, the only difference being that in baking a higher temperature would be used and wood smoke would not usually be added.

The arrangement of parts in order to fry with fat, pan broil, or boil with water, is: first the grill 74 is removed, then the unit 76, which leaves the fire-box open at the top, now a plain bar support is placed over the fire-box opening, on which the type utensil desired is placed. As is usual with the three types of cooking listed for this arrangement a hot fire is needed, and as wind affects these three cooking processes worse by heat loss, since higher heat is needed, it will be noted that the outside housing of the cooker and the lid protect these operations to the point, that they could not be done otherwise in the open.

In order to broil (as to broil a steak over the coals) or to barbecue in the old way over the coals, and for such as hamburgers, first, the grill 74 is removed, then unit 76, this leaves the fire-box open at the top, now the grill 74 is replaced on the top row of pins or grill rests or cocked at an angle and inserted on the lower grill rests to accomplish the desired height of the grill from the fire. In these operations a hot fire would be generally used.

The present cooking device is very economical, since the fire is all contained in a central location, directly under the cooking parts, with perfect control on it, either for a slow fire or a hot one. Whatever the need may be; and since the natural direction for the heat is up into the cooker, none is lost in this manner, and also due to the design, heat is not lost because of the outside elements. Hence all the heat is used for cooking. Now, when through cooking, the remaining charcoal may be left in the cooker fire-box, for use in the next refueling, as it is saved by the simple means of being able to cut off the oxygen, thereby stopping the fire, leaving the remaining charcoal unburned. By design of the cooker the charcoal left will be dry and ready for use, as rain cannot wet the fire-box. The greatest economy factor of this invention is that by design and operation it takes much less charcoal to fire it than is needed in other cookers to fire them for the same length of time.

The present cooker is easy to fire in that charcoal, wood chips etc., can be added to the fire-box when needed, without dismantling parts or removing whatever is being cooked, by just opening a fire-box door and putting it in.

Shaking down the ashes is attained by simply grasping the handles on the cooker and slightly jarring legs of the cooker against the ground, which shakes the ashes off of the grate in fire-box into a conical shaped, semi-self cleaning ash box, and the ashes slide right out the vent door in the bottom and may be dropped into a container, thereby solving the ash problem with no messy work. This door in the bottom serves also as the ventilator as well as for ash releasing. Since ashes are released during the cooking process, they never interfere with the control of the heat by blocking ventilation so as to change it.

This cooker has a special safety feature, for in this invention the hot liquid or fat, and any ensuing blaze, would be contained in the cooker, and not spilled on people or the operator around the cooking.

To use the cooker for smoke curing, it would have the unit 76 in place in fire-box opening 28 and the grill 74 in place on the upper grill rests. Now, to get the heat for smoking, three or four charcoal briquettes are lighted and some chips or blocks of the desired wood are laid on the burning charcoal. Then just enough ventilation is let in the cooker to just keep a steady slow smoke going and from time to time will have to have more briquettes and wood chips for the smoke, to keep it going for long periods. The time this is done will depend on the size, kind or how much smoke cure is wanted for different things.

Referring now in greater detail to the drawings wherein similar reference characters refer to similar parts, there is shown a cooking device, generally designated 10, comprising a housing 12 of generally cylindrical shape having an open top closable by a lid 14 having a peripheral flange 16 frictionally engageable around the upper rim of the housing defining the open top. This lid 14 is provided with a central opening 18 defined by an upstanding neck portion 20. The neck portion 20 is open at its top and is closable by a lid 22 mounted on a bowed spring-metal strip 24. The strip 24 is frictionally engaged within the neck portion 20 and is held in tensioned engagement therewith by its inherent flexibility. By pulling up or pushing down on lid 22, the lid 22 can either be closed down onto the neck portion 20 to completely close its top opening or it may be set in any upward position of adjustment to vary the opening between itself and the top of the neck portion 20. The spring strip 24 holds it in its position of adjustment automatically. The neck 20 serves as a vent means and the lid 22 serves to open or close the vent means or adjust its opening.

The bottom of the housing 12 is defined by an upwardly and inwardly inclined arcuate bottom wall 26 having a central opening therein. Defining this opening is a cylindrical fire-box 28 integrally depending from the bottom wall 26. At one side of the fire-box 28 is provided an access opening 30 closed by a door 32 which may be slidable or swingable, as desired. The bottom of the fire-box 28 comprises a perforated grate or plate 34 (shown best in Fig. 5); and below this plate 34 is provided a conical ash-box 36 integral with fire-box 28.

The ash-box 36 is provided, at its lower end, with a bottom-opening vent aperture 38. This aperture 38 is closable by a butterfly valve 40 hingedly mounted on a rotatable rod 42 through bearings 44 in the housing. The rod 42 extends through a central aperture in a semi-circular plate 46 which is, itself, mounted on a supporting rod 48 connected to the fire-box 28. A lever 50 having a handle 52 is connected to rod 42, on the opposite face of plate 46 from the flap 40, and this lever is adapted to contact each of a semi-annular series of buttons 54 on the face of the plate 46 as it rotates around the plate. Each of these buttons 54 represents a unit of pivotal adjustment of the flap-door 40, as measured in relation to the movement of lever 50. The flap-door 40 is used for a double purpose, one being to adjust the air inlet opening at the bottom of the combination fire and ash box construction, and the other being to serve as an ash-removal door. In this manner, the opening 38 not only serves to regulate the heat but also permits ash removal during cooking.

The housing 12 is supported on legs 56 and 58 and is also provided with handles 60 to move it around. A similar handle is provided at 62 on the cover lid 14.

The legs 56 and 58 differ somewhat, the legs 56 being either or tubular or solid rod construction and extending down below the leg 58. The leg 58 is of tubular construction having a top opening 64 in the plane of bottom wall 26. The leg 58 is also provided with a bottom opening or the like will flow down the inclined bottom wall 26 and then through the leg 58 to the ground, or to a suitably placed receptacle thereunder.

At its lower end, just above the bottom opening, the leg 58 is provided with a bracket 66 extending laterally thereof. This bracket 66 has an axle 68 which supports a rotatable wheel 70. The wheel 70 extends down to the level of the legs 56 so that the device is supported on two fixed legs and one movable leg. In this manner, when the device is to be moved, the handles 60 are lifted up to lift the legs 56 from the ground and to support the device only on wheel 70 like a wheelbarrow. In this position, it is rolled to the new area and then the legs 56 are set down to somewhat anchor it in place.

Within the housing 12 there are provided grill rests or supports 72 extending inwardly from the inner surface of the housing 12. These rests 72 are adapted to support a generally circular grill 74 made of wire mesh or the like, in the usual manner. A second set of these rests is provided in a lower plane in order to adjust the grill closer to the fire-box 28, when unit 76, the heat and grease deflector are out, for broiling operation. Handle lifter rings 75 are provided to assist in removing the grill 74 as desired.

Adapted to be releasably positioned within the open top of the fire-box 28 is a heat and grease deflector unit, generally designated 76. This heat and grease deflector unit comprises an upper, shallow, conical plate 78, and a lower, somewhat less shallow, inverted conical plate 80, the two plates 78 and 80 extending in opposite directions so that the apex of the plate 78 points upwardly and the apex of the plate 80 points downwardly. The plate 78 is of somewhat larger diameter than the plate 80 so that its periphery over-hands the lower plate 80 in umbrella-like fashion, and the lower plate 80 is of somewhat greater diameter than the fire-box opening in reverse umbrella fashion. The plates 78 and 80 are held in spaced relation to each other by a series of annularly-spaced brackets 82, each of which is provided with a pair of opposite lateral flanges, one at each end; these flanges being connected to the upper and lower plates 78 and 80 respectively by rivets or the like 84.

Depending from the lower plate 80 are fingers 86 having upper flanges connected to the bottom of plate 80 by rivets or the like 88. These depending fingers 86 are provided with transversely-extending pins 90 intermediate their length. The fingers 86 are adapted to snugly fit into the open upper end of the fire-box 28 and the pins 90 bear on the inner edge of the bottom wall 26 to hold the unit 76 in place.

Figure 2:
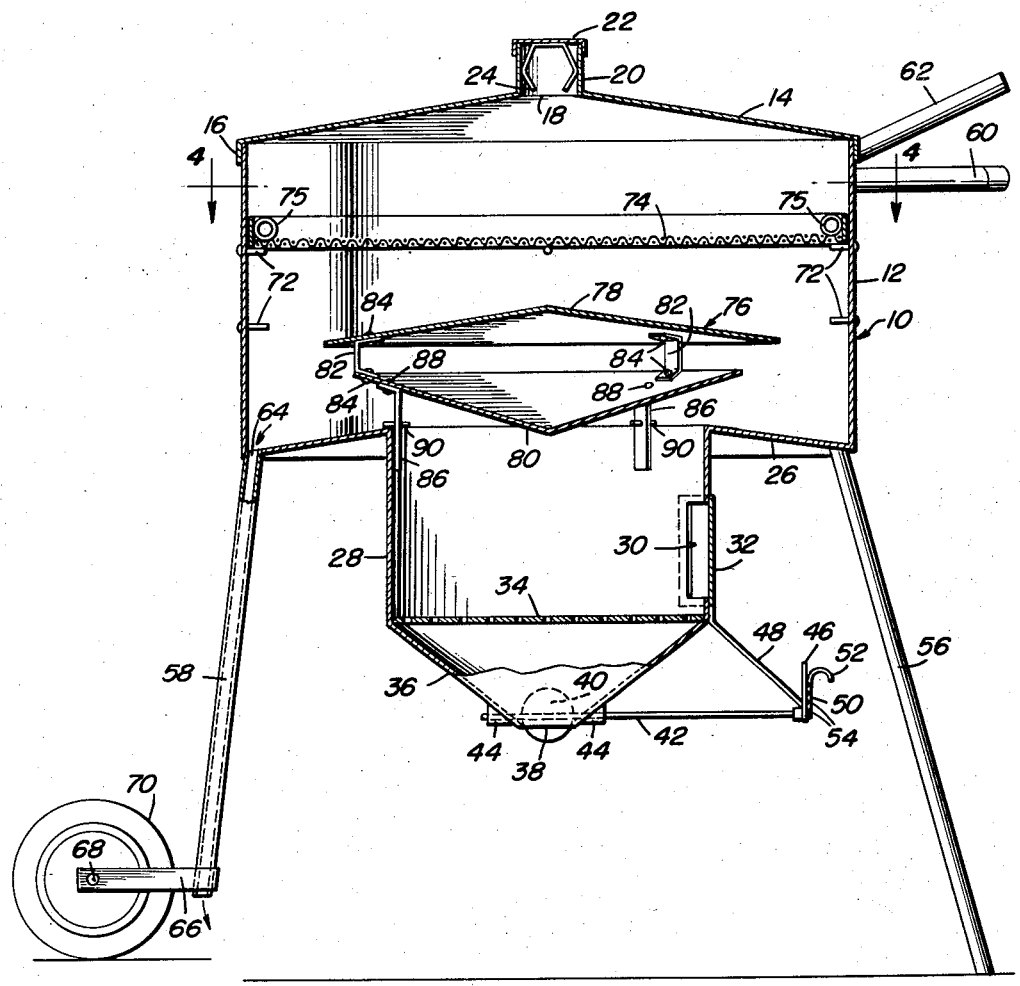
Fig. 2 is a side view, partly in section and partly in elevation of a cooking device embodying the present invention.

In operation of the device, when the unit 76 is in position within the housing 12 (as in Fig. 2) and when the grill 74 is in position thereabove, any grease or other fluid falling from the food being cooked on the grill 74 is deflected by the plate 78 to the bottom wall 26 from where it drains down through the hollow leg 58. At the same time, the plate 80 deflects the heat from the fire-box 28 to the sides of the housing from where the heat is evenly dispersed toward the grill 74. The plate 80 also prevents any sudden blaze from the firebox from reaching the food on the grill 74. The air space between plate 80 and plate 78 is at its greatest distance apart at the hottest point over center of fire-box which keeps plate 78 from getting hot enough to smoke the drippings.

During this cooking operation, the lid 14 is in place while the vent lid 22 on the neck 20 may be closed or adjustably opened. In this manner, a combination broiling and baking operation may be effected. If it is desired to smoke the food, the same type of operation is used except that a small amount of hardwood, such as oak, hickory or applewood, in the form of chips, blocks or sawdust, is added to the ordinary charcoal briquettes to provide a sweet smoked flavor to the meat.

Figure 6:
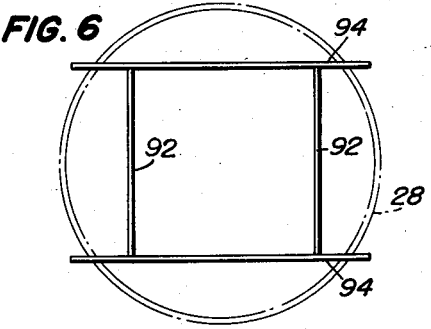
Fig. 6 is a top view of a modification of the device wherein a support utilizable for frying or holding a pot is positioned over the fire box.

In order to fry or boil the food, the grill 74 and unit 76 are removed, and a bar support is substituted over the fire-box 28. As shown in Fig. 6, the arms 94 extend so that they rest on the upper periphery of the fire-box 28. Containers for cooking are placed on the bar support while in order to effect a boiling operation, a kettle or pan of water is placed on the bar support and the food is placed therein. For deep-fat frying, the water in the kettle or pan is replaced by fat.

In any of the cooking procedures, when wanted, a smoked flavor may be additionally imparted by adding the hardwood to the charcoal in the fire-box 28 in the same manner as used when smoking.

It should be noted that in each case described above, the food as well as the fire are protected from the elements by the housing 12 and lid 14.

In order to douse the fire when the cooking is over, it is merely necessary to close the lid 22 and the flap-door 40. This cuts off the oxygen so that the fire is extinguished. This permits unused fuel to be saved for the next cooking period. In this next cooking period, the ashes are merely knocked off the grate or plate 34 and these ashes slide down through the aperture 38. This eliminates the arduous job of having to scrape out the ashes before using the device again. The device is then ready for use.

Although this invention has been described in considerable detail, such description is intended as being illustrative rather than limiting, since the invention may be variously embodied, and the scope of the invention is to be determined as claimed.

Having thus set forth and disclosed the nature of this invention what is claimed is:

1. A cooking device comprising a substantially imperforate housing having an open top, a removable lid on said open top, vent means on said lid, said vent means being adjustable from a closed position to various positions of open condition, a bottom wall on said housing, a central opening in said bottom wall defining the outer periphery of a substantially imperforate fire-box, said fire-box depending to a position below said bottom wall, said fire-box being open at its top and closed at its bottom by a perforated grate, a substantially imperforate, conical ash-box depending from said fire-box below said grate, said ash-box having a base portion adjacent said grate and an apex portion below said base portion, an aperture in said ash-box adjacent said apex portion, and means to adjustably open and close said aperture in the ash-box, and a grease and heat deflecting unit supported by said fire-box, said unit comprising a lower imperforated inverted conical plate having its apex extending downwardly, and of a diameter in excess of the size of the fire-box, legs depending from the periphery of said plate, pins extending laterally from said legs for engagement with the rim of said fire-box, an upper imperforate conical plate of a greater diameter than said lower conical plate and having its apex extending upwardly, and annularly spaced brackets supporting said upper conical plate on said lower conical plate in spaced relation to provide an air space between said plates.

2. The cooking device of claim 1 wherein said bottom wall is inclined downwardly from the center toward the periphery, and is provided with a drain outlet.

3. A cooking device comprising a generally cylindrical housing, an open top on said housing, a removable lid on said open top, a fire-box centrally positioned in said housing and depending from the central portion of its bottom wall, said bottom wall being inclined downwardly from said fire-box toward its periphery, a drain opening in said bottom wall, and a deflector unit releasably positioned on said fire-box, said deflector unit comprising an upper conical plate and a lower conical plate, said conical plates being connected base-to-base in spaced, coaxial relationship to each other, and said upper plate being of greater diameter than said lower plate, and said lower plate being of greater diameter than fire-box opening.

4. The cooking device of claim 3 wherein a conical ash-box depends from said firebox, there being a perforated grate between said fire-box and said ash-box, the apex of said conical ash-box being at its lower end, and a vent opening adjacent said apex.

References Cited in the file of this patent

UNITED STATES PATENTS

| | | | |
|---|---|---|---|
| 106,288 | Runyon | Aug. 9, 1870 |
| 115,984 | Roe | June 13, 1871 |
| 521,410 | Hayes | June 12, 1894 |
| 848,018 | Engelhard | Mar. 26, 1907 |
| 884,718 | Cowhig | Apr. 14, 1908 |
| 904,382 | Van P | Nov. 17, 1908 |
| 1,042,273 | Roe | Oct. 22, 1912 |
| 1,259,417 | Lamb | Mar. 12, 1918 |
| 1,762,035 | Soylian | June 3, 1930 |
| 2,175,043 | Vandergrift | Oct. 3, 1939 |
| 2,501,381 | Doblin | Mar. 21, 1950 |
| 2,786,463 | Vincent | Mar. 26, 1957 |